United States Patent [19]

Beasley et al.

[11] Patent Number: 4,630,690

[45] Date of Patent: Dec. 23, 1986

[54] SPIRALLING TAPERED SLIP-ON DRILL STRING STABILIZER

[75] Inventors: Thomas R. Beasley, Katy; Chuan C. Teng, Houston, both of Tex.

[73] Assignee: Dailey Petroleum Services Corp., Conroe, Tex.

[21] Appl. No.: 755,053

[22] Filed: Jul. 12, 1985

[51] Int. Cl.⁴ .................................. E21B 17/10
[52] U.S. Cl. .................................. 175/57; 175/325; 403/370; 403/371
[58] Field of Search .............. 175/325, 323, 320, 57; 166/241; 308/4 A; 403/370, 371, 374, 367; 29/456

[56] References Cited

U.S. PATENT DOCUMENTS

| | | | |
|---|---|---|---|
| 2,671,641 | 3/1954 | Hinkle | 308/4 A |
| 3,253,332 | 5/1966 | Howlett et al. | 403/371 |
| 3,343,808 | 9/1967 | Howlett | 403/371 |
| 3,754,609 | 8/1973 | Garrett | 175/323 |
| 3,916,998 | 11/1975 | Bass et al. | 166/301 |
| 4,000,549 | 1/1977 | Brumley et al. | 308/4 A |
| 4,101,179 | 7/1978 | Barron | 308/4 A |
| 4,105,262 | 8/1978 | Richey | 308/4 A |
| 4,131,167 | 12/1978 | Richey | 175/323 |
| 4,245,709 | 1/1981 | Manuel | 175/325 |
| 4,258,804 | 3/1981 | Richey et al. | 175/325 |
| 4,337,088 | 6/1982 | Moses | 75/128 A |
| 4,349,050 | 9/1982 | Bergstrom et al. | 138/147 |
| 4,378,135 | 3/1983 | Enen et al. | 308/4 A |
| 4,384,626 | 5/1983 | Derouin | 175/57 |
| 4,438,822 | 3/1984 | Russell | 175/325 |

FOREIGN PATENT DOCUMENTS

| | | | |
|---|---|---|---|
| 1090325 | 11/1980 | Canada | 255/28 |
| 2747541 | 4/1979 | Fed. Rep. of Germany | 403/371 |
| 2063422A | 11/1979 | United Kingdom | |

Primary Examiner—James A. Leppink
Assistant Examiner—Hoang C. Dang
Attorney, Agent, or Firm—Arnold, White & Durkee

[57] ABSTRACT

The present invention includes a tubular body member with a central bore which has two spiralling or threaded interior surfaces, each interior surface having a leading edge at nearly right angles to the longitudinal axis of the body and a sloped or tapered trailing edge along the bore from an end portion toward the central portion of the bore. The upper portion of the body has a left-hand spiralling or threaded surface. The lower portion of the body has a right-hand spiralling or threaded surface. Inserted into the central portion of the body member from each end is a slip segment or member. The outer surface of the upper slip segment has a left-hand spiralling or threaded surface, whereas the outer surface of the lower slip segment has a right-hand spiralling or threaded surface. Each such spiralling or threaded surface conforms to the spiralling or threaded surface of the corresponding interior surface of the stabilizer body. The interior surface of each slip segment opposite a spiralling outer surface of the segment is serrated to firmly engage a drill collar.

In the event the stabilizer becomes stuck in the hole the stabilizer is capable of being further tightened onto the collar by a right-hand rotation, an up pull or a down push.

29 Claims, 20 Drawing Figures

SPIRALLING TAPERED SLIP-ON DRILL STRING STABILIZER

BACKGROUND OF THE INVENTION

A. Field of the Invention

This invention relates to a drill collar stabilizer used in oil well drilling operations, which can be positioned anywhere along a collar string. A stabilizer typically is equipped with exterior blades. The stabilizer is used as an aid to prevent the drill collar from sticking to the walls of the borehole. The stabilizer also prevents eccentric action of the long drill string as the borehole is drilled to greater depths.

B. Background

Traditionally, stabilizers have been made up between drill collars as the drill string has been run into the hole. This arrangement, however, has had several undesirable features. For example, it requires an extra tool joint connections between the drill collars, and these connections increase the possible points of metal fatigue in the string. It also causes variations in the drill collar stand lengths which, in turn, increase joint makeup time and detract from safe operating conditions for drilling rig personnel. Additionally, the traditional stabilizer practice requires a special bottom hole assembly which increases drilling costs and does not permit adjustment of the stabilizer along the drill collar without changing drill collar standard lengths.

The first generation of releasable drill string stabilizers solved certain problems by permitting positioning anywhere along the drill string. At the same time, however, they created other problems in that a one piece slip or wedge (segment) was placed in each end cap. This segment required an inordinate amount of force to compress and properly position the segment. The use of nonmagnetic materials, which are highly desirable in oil field work, created an additional problem in that the compressed one piece slip segment failed to regain its original shape and thus could not properly be positioned in an end cap. The specialized tools and devices which were then needed to safely compress the one piece slip segment unfortunately resulted in undesirable new labor and equipment costs. These costs were deemed undesirable by the oil well drilling operators. U.S. Pat. No. 4,258,804 describes one such one-piece slip segment.

The use of lock on stabilizers, consisting of a body with externally extending blades and two end caps for connecting to the body, has also been suggested to solve the undesirable aspects of nonstandard drill collar stand lengths. One such stabilizer is connected between the pin and box joints on a drill string by positioning an inside locking ring inside the body, and thereafter positioning an outside locking ring on each end of the body with a tapered surface facing the inside locking ring. The two end caps are used to force the rings together within the body to connect the stabilizer to the drill collar. A major difficulty encountered with this arrangement has been the inability to reuse the solid rings after once being attached. This difficulty is due to the fact that the rings become deformed when they are clamped around the drill string and thus will not release when the end cap is removed. U.S. Pat. No. 3,916,998, U.S. Pat. No. 4,101,179, and U.S. Pat. No. 4,105,262 show combinations of split rings and/or wedging clamps which have traditionally been used for attaching a stabilizer to a drill collar.

Additionally, some of the prior art devices have an excessive number of parts. Some examples of these are shown in U.S. Pat. No. 4,438,822, U.S. Pat. No. 4,131,167, and U.S. Pat. No. 4,245,709. In general, the devices render the stabilizers difficult to assemble at the well site, or they are subject to extremely complicated assembly procedures. The excessive number of parts stems from the use of wedges, slip segments, O-rings, end caps, springs, braided sleeves, belleville washers and other similar devices.

SUMMARY OF THE INVENTION

It is a general object of the present invention to provide a stabilizer of simple and inexpensive construction, with comparatively few parts. The stabilizer is releasably connected to a drill collar, is capable of placement anywhere along the drill collar, and can easily be assembled at the drilling platform without specialized equipment and with a minimal expenditure of labor.

In general terms, one embodiment of the present invention includes a cylindrical or tubular body member with a central bore which has two spiralling or threaded surfaces on the interior of the cylindrical or tubular body. Each spiralling or threaded surface on the interior surface of the stabilizer body has an inward spiral along the bore from each end portion toward the middle portion. Additionally, the spiralling or threaded surfaces have a unique taper which limits the longitudinal movement of an internal slip with respect to the stabilizer body as the stabilizer is tightened onto the collar. The upper portion of the body from the upper end to the central portion has a left-hand spiralling or threaded surface. The lower portion of the body from the lower end to the central portion has a right-hand spiralling or threaded surface. The body member also defines a central bore which is large enough to accommodate a drill collar. Inserted into the central portion of the body member from each end is a slip segment. The outer surface of the upper slip segment has a left-hand spiralling or threaded surface, whereas the outer surface of the lower slip segment has a right-hand spiralling or threaded surface. Each such spiralling or threaded surface cooperatively mates with the spiralling or threaded surface of the corresponding interior surface of the stabilizer body. The interior surface of each slip segment opposite the spiralling or threaded outer surface of the segment is serrated or otherwise configured to firmly engage a drill collar. In one embodiment of this invention, each slip segment also has a plurality of longitudinal grooves or slits. The slits permit the slip to expand, as the collar is inserted into the stabilizer body. This feature is important because of the wide variation in drill collar diameters for any one collar standard size.

In one embodiment of this invention, the slip additionally has a peripheral, generally arcuate slot at the end opposite the outer end and adjacent the center portion of the body. The slot is used to interengage a key at the center of the stabilizer body.

The stabilizer of this invention has improved characteristics relative to the stabilizer disclosed in pending application Ser. No. 614,474, filed May 29, 1984, which is owned by the assignee of this application.

BRIEF DESCRIPTION OF THE DRAWINGS

The nature and advantages of the invention will become more apparent upon reading the following detailed description of the invention with reference to the drawings in which.

DESCRIPTION OF EMBODIMENTS

Figure 1:
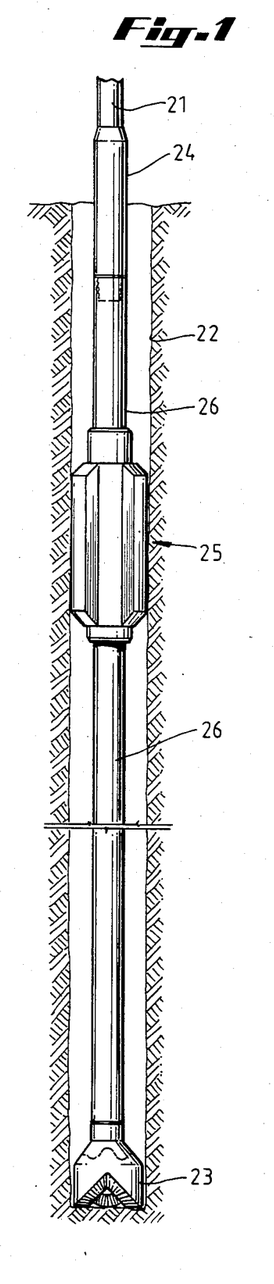
FIG. 1 is an elevational view, partly in section, showing a stabilizer of the present invention installed on a drill collar in a well.

FIG. 1 shows a drill string, including a drill collar 26, positioned within a borehole 22 which is formed by drill bit 23 in a manner well known in the art. As is also well known, as the drill bit 23 drills the borehole 22, it is necessary to add sections of drill pipe 21 to the drill string by conventional pin and box joints as illustrated at 24. A single stabilizer of the present invention, generally designated by numeral 25, is secured to the drill collar 26. It is to be understood, however, that multiple such stabilizers may be used if so desired and as required to maintain stability of the drill string.

Figure 2:
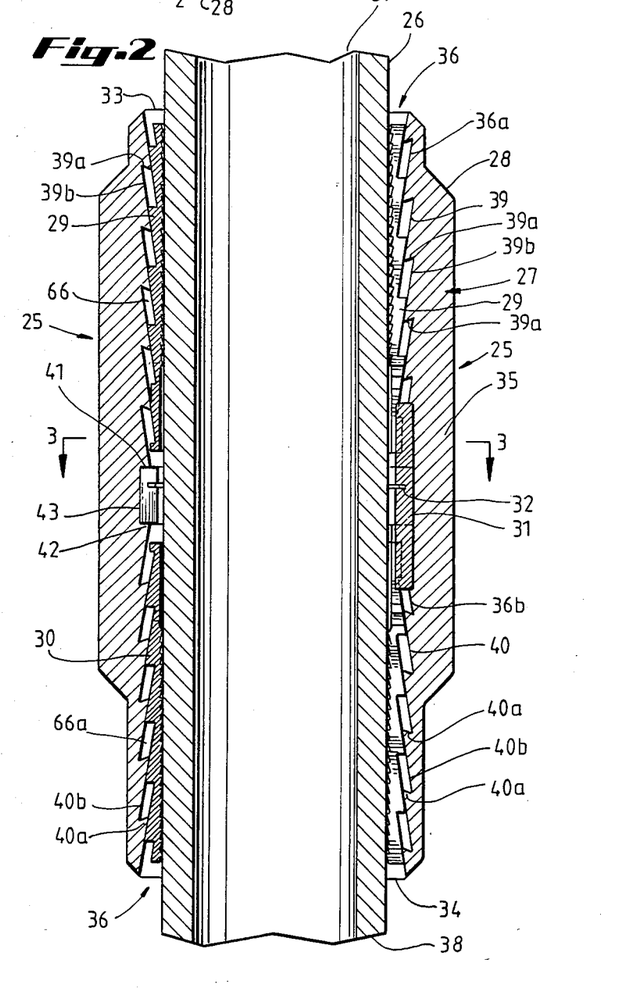
FIG. 2 is an enlarged elevational view of a stabilizer, partly in section, illustrating a detailed construction of the stabilizer shown in FIG. 1 and cut along lines 2—2 in FIG. 3.

As illustrated in FIG. 2, stabilizer 25 includes a stabilizer body 27 having stabilizer blades 28 extending outwardly therefrom to contact the sides of the well borehole 22 (see FIG. 1). Stabilizer 25 also includes upper slip segment or basket slip 29 which has a left-hand spiralling or threaded surface, and lower slip segment or basket slip 30 which has a right-hand spiralling or theaded surface. Stabilizer 25 further includes key 31 and key retainer ring 32.

Stabilizer body 27 is a cylindrical or tubular member with a central bore 36 having a top opening 33, a bottom opening 34 and a central section 35.

The upper portion of stabilizer body 27 has an interior central bore 36 with an upper interior surface 36a and a lower interior surface 36b. The upper portion of stabilizer body 27 has an interior surface 36a, with a constant mean radii left-hand spiralling or threaded surface 39.

Left-hand spiralling or threaded surface 39 has a leading edge 39a which is nearly at right angles to the longitudinal axis of the stabilizer body 27. In addition the thread 39 also has a sloped or tapered trailing edge 39b which slopes or tapers away from the leading edge 39a.

In a similar manner right-hand spiralling or threaded surface 40 has a leading edge 40a which is nearly at right angles to the longitudinal axis of the stabilizer body 27. In addition the thread 40 also has a sloped or tapered trailing edge 40b which slopes or tapers away from the leading edge 40a.

The left-hand spiralling or threaded surface 39 has a constant mean radii inward spiral from the top opening 33 of central bore 36 to the central portion 35. In a similar fashion the lower portion of stabilizer body 27 has an interior surface 36b with a right-hand spiralling or threaded surface 40. This right-hand spiralling or threaded surface 40 likewise has a constant mean radii inward spiral from the lower opening 34 of of central bore 36 to the central section 35.

Also shown in FIG. 2, inserted through central bore 36, is the drill collar 26. Drill collar 26 is cut away at the top end 37 and bottom end 38 for illustration only.

Left-hand spiralling or threaded surface 39 ends at central section 35 at shoulder 41. In a similar fashion the right-hand spiralling or threaded surface 40 ends in central section 35 at shoulder 42. Shoulders 41 and 42 define a circumferential or arcuate slot 43 in central section 35.

Figure 5:
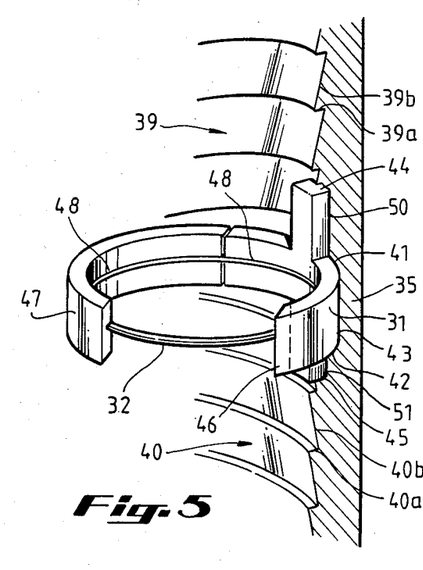
FIG. 5 is an enlarged elevational view, partly in section, illustrating key segments for the slip segments in FIGS. 2 through 4, and the retainer ring used to hold the key segments in place.

Referring to FIG. 5, slot 43 accommodates key 31. Key 31 comprises a plurality of ring-like segments 46 and 47 and two longitudinal protuberances or lugs 44 and 45.

To facilitate machining of stabilizer body 27, key member 31 is preferably a segmented ring with a rectangular cross section. The longitudinal protuberances or lugs 44 and 45 have a rectangular cross section with a longitudinal axis parallel to the longitudinal axis of the stabilizer body 27. As shown in FIG. 5, ring segment 47 is similar to ring segment 46, except that it has no longitudinal protuberances or lugs. In the preferred embodiment, two ring segments 47 and one ring segment 46 are used. The two ring segments 47 have no longitudinal protuberances or lugs. Segments 46 and 47 have a retainer ring slot 48 to accommodate a retainer ring 32. Retainer ring 32 urges releasing key members 46 and 47 radially outward into circumferential slot 43.

Key segments 46 and 47 have a cross-sectional area and outside diameter sized to fit within the inside diameter of radial or arcuate slot 43 and also between shoulder 41 and shoulder 42.

As best shown in FIG. 5, left-hand spiralling or threaded interior surface 39 is interrupted by an upper longitudinal slot 50 at the central section 35 of stabilizer body 27. Slot 50 has an outside diameter and cross-sectional area sized to accommodate upper key member or lug 44.

In a similar fashion the right-hand spiralling or threaded interior surface 40 is interrupted by lower longitudinal slot 51. Slot 51 has an outside diameter and cross-sectional area sized to accommodate lower key member or lug 45.

Figure 3:
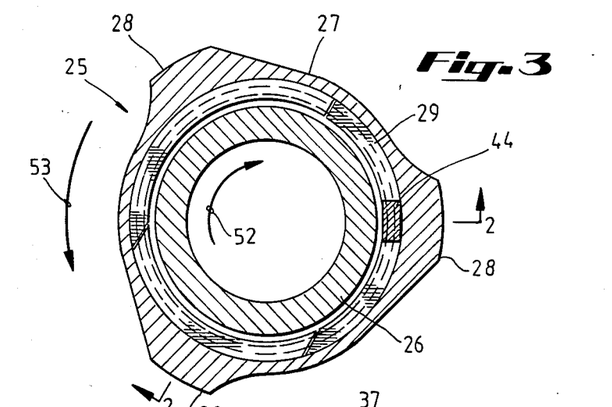
FIG. 3 is a plan view, taken along the section lines 3—3 in FIG. 2, of the stabilizer blades, drill collar, slip segments, and key.

Referring to FIG. 3, upper lug 44 protrudes radially inwardly from central section 35 sufficiently to grasp upper slip segment or basket slip 29 without rubbing against drill collar 26.

Also illustrated in FIG. 3 is rotational arrow 52. The clockwise orientation of arrow 52 illustrates normal drill string/collar rotation (looking downward). Further description of this invention will be described with reference to this standard clockwise rotation. Also illustrated in FIG. 3 is a counterclockwise arrow 53 which illustrates the rotary force or torque, on the stabilizer 25, relative to the drill string as the string is rotated as shown by collar rotational arrow 52. The stabilizer's rotary force or torque, illustrated by arrow 53, is due to the frictional forces exerted by the walls of borehole 22 as the collar 26 is rotated.

Figure 4:
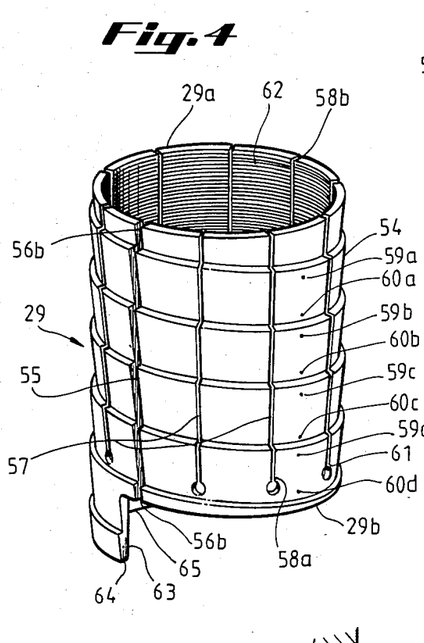
FIG. 4 is a detailed perspective view of one of the slip segments shown in FIGS. 2 and 3.

Referring now to FIG. 4, an upper slip segment or basket slip 29 is illustrated. The upper slip segment or basket slip 29 has a left-hand spiralling or threaded surface 54 which cooperatively matches the left-hand spiralling or threaded surface 39 in stabilizer body 27. Upper slip segment or basket slip 29 has a longitudinal slot 55 cut from the bottom end 56a to the top end 56b of slip or basket segment 29. Slot 55 permits expansion of slip 29 as the slip 29 and stabilizer 25 are installed onto the drill collar 26. Additionally, a plurality of partial longitudinal slots 57 are preferably provided on slip 29 to permit the slip to conform to the outside diameter of the collar. Partial longitudinal slots 57 run from the bottom portion 58a of partial longitudinal slots 57 to the top end 58b of partial longitudinal slots 57. Additionally, a stress relief point 61 is located at bottom portion 58a of each longitudinal slot 57. Stress relief point 61 is generally circular in configuration and is a hole through the wall of segment 29.

The basket slip 29 is preferably manufactured in such a manner as to produce an equal radius at equivalent points along an imaginary longitudinal line on the outer periphery of slip 29.

For example, referring to FIG. 4, points 59a, 59b, 59c, and 59d all have equal radii from the longitudinal centerline of slip 29. In a similar manner points 60a, 60b, 60c, and 60d have equal radii from the longitudinal centerline of slip 29.

The radii of points 59a and 60a however are not equal. The radius of point 60a is smaller than the radius of point 59a. The slope of a line drawn from points 59a to 60a is equal to the slope of a line drawn from point 59b to 60b. In a similar fashion the slopes of lines drawn from point 59c to 60c; and 59d to 60d are equal to the slope of a line drawn from point 59a to 60a.

With an equal radius at equivalent points on the slip as discussed above, a spiralling or threaded surface 54 is cut on the slip. The surface spirals from the top portion 29a of slip 29 to bottom portion 29b of the slip 29. The spiralling surface is a continuous spiralling surface from top 29a to bottom 29b.

As previously discussed, the interior spiralling or threaded surfaces of the interior of stabilizer body 27 have a constant mean radii. The constant mean radii describes a constant inside radii for similar points along an imaginary longitudinal line on the interior of the body 27.

Lower slip segment or basket slip 30 has a longitudinal slot similar to longitudinal slot 55, partial longitudinal slots similar to partial longitudinal slots 57, and stress relief points 61. Lower slip segment or basket slip 30 is essentially illustrated in FIG. 8, where it is referred to in connection with the alternate stabilizer embodiment illustrated in FIGS. 7 through 10 inclusive. For the embodiment illustrated in FIG. 2 slip segments or basket slips 29 and 30 are the same length.

The inside radii for similar or equivalent points is maintained at a constant as the inside surface 39 and 40 of body 27 spirals toward the central section 35 of the body 27; to permit the slips 29 and 30 to match a corresponding spiralling or threaded surface on the interior of body 27.

Upper slip segment or basket slip 29 contains serrations and/or teeth 62 on its interior surface. Serrations and/or teeth 62 aid in gripping the drill collar 26 inserted through the central portion of stabilizer 25.

The left-hand spiralling or threaded surface 54 on upper slip segment or basket slip 29 ends abruptly at segment stop 63 and 63a (not shown). Segment stops 63 and 63a (not shown) are essentially shoulders which extend upward from bottom 64 of slip 29 to top 65 of slip 29. The length of stop or shoulder 63 and 63a (not shown) are sufficient to bear against upper key member or lug 44 shown in FIG. 5.

Referring to FIG. 4 segment stop 63 and 63a (not shown) may be fabricated simply by cutting out an arcuate notch in the bottom of slip 29. The placement of segment stops 63 and 63a (not shown) is important in that segment stop 63 should be positioned in near proximity to longitudinal slot 55 as shown in FIG. 4.

Lower slip segment or basket slip 30 shown in FIG. 2 also has a segment stop similar to segment stop 63 illustrated in FIG. 4; however, slip segment or basket slip 30 stop will bear against lower key member or lug 45 shown in FIG. 5.

To place the stabilizer 25 on the drill collar 26, slip segments 29 and 30 are first inserted into the interior of the stabilizer 25 by interengaging each slip with its respective spiralling or threaded interior surface 39 and 40.

The slips 29 and 30 are threaded into their respective stabilizer body interior threads 39 and 40 until the slip stop 63 on each of the slips 29 and 30 interengages its respective longitudinal protuberances or lug 44 and 45.

At the time slip or segment stop 63 on slips 29 and 30 butts up against its respective longitudinal protuberance or lug 44 and 45 the slip cannot be further threaded into the body.

The slip segments 29 and 30 are inserted in such a manner that voids 66 and 66a (see FIG. 2) do not exist, thus providing an inner diameter between the serrations 62 of each slip segment which represents in essence the released stabilizer position. In this released position the slip inner diameter may expand to its maximum diameter when the collar is inserted into the stabilizer. In this released stabilizer position, the stabilizer may be installed onto the drill collar.

The stabilizer 25 is installed onto the drill collar by placing the stabilizer over a collar length prior to making up the pin and box joint connection for the next length. The stabilizer is placed over the collar while rotating the stabilizer in a clockwise direction and maintaining the collar relatively stationary. The stabilizer is then positioned on the collar by elevating the drill string, including the collar, while rotating the stabilizer 25 in a clockwise direction and not imparting any rotational movement to the collar 26 until the stabilizer is positioned at the desired elevation. When the stabilizer 25 is positioned at the desired elevation, the stabilizer is locked on to the collar by rotating the stabilizer body 27 counterclockwise on the collar 26 while keeping the collar 26 relatively stationary.

Tightening of the stabilizer 25 is accomplished by gripping the stabilizer 25 with the drilling table vise or a tong. The collar 26 is gripped by another tong. The stabilizer is rotated in the counterclockwise direction as the collar 26 is held relatively stationary. This rotation causes the stabilizer body 27 to rotate while the slips 29 and 30 are held relatively stationary. The slips 29 and 30 are held relatively stationary by the gripping action of serrations 62 on the stationary collar 26.

As the stabilizer body 27 rotates in a counterclockwise manner with respect to the slips, the slips 29 and 30 grip collar 26. As the slips 29 and 30 grip collar 26, a rotational torque is applied, in the clockwise direction (looking down) to the slips 29 and 30.

This rotational torque applied to slips 29 and 30 tends to act in a manner to unthread slips 29 and 30 from stabilizer body 27. When the stabilizer 25 is on the collar 26, the gripping action of slip 29 on the collar 26 and the gripping action of slip 30 on the collar 26 restrain slips 29 and 30 from unthreading out of the stabilizer body. Since slips 29 and 30 are restrained from unthreading; the rotational torque applied to the stabilizer 25 causes the slips to ride on the sloped or tapered trailing edge 39b and 40b of the stabilizer body threads 39 and 40. This in turn results in a diminution of the inside diameter of the slips 29 and 30 which results in a gripping of the collar 26.

This tightening action results in voids 66 and 66a being created as the threads 39 and 40 of stabilizer 25 rotate about the stabilizer 25 longitudinal centerline.

The spiralling or threaded surfaces 39 and 40 on the interior of the stabilizer 25 coupled with the corresponding spiralling or threaded surfaces 54 on slips 29 and 30 result in a clamping action of slips 29 and 30 as the stabilizer 25 rotates about the longitudinal centerline of the collar 26. This clamping action results from the spiralling or threaded surfaces 39 and 40 of the body 27 bearing against the spiralling or threaded surfaces 54 on slips 29 and 30 in a manner tending to reduce the slip inside diameter. This diminution in the slip inside diameter consequently results in a clamping of the collar 26.

The configuration of the spiralling or threaded surfaces 39 and 40 on body 27 and the matching spiralling or threaded surface 54 on each of the slips 29 and 30 permits the stabilizer 25 to tighten onto the collar 26 very quickly with very little rotation of the stabilizer 25 with respect to the collar 26.

This tightening of stabilizer 25 onto the collar 26, with very little rotation of the stabilizer 25, results in a relatively small longitudinal displacement of the slips 29 and 30 with respect to the stabilizer body 27. This relatively small longitudinal displacement of the slips 29 and 30, with respect to the body 27, is of interest because slip serrations 62 on slips 29 and 30 should remain relatively stationary with respect to collar 26 as the slips are tightened. In order to minimize any longitudinal displacement of the slips 29 and 30 with respect to collar 26, the longitudinal displacement of the body 27, with respect to slips 29 and 30, is likewise preferably minimized.

The relatively small longitudinal displacement of the slips 29 and 30 with respect to the body 27 results in a much more efficient tightening of the stabilizer 25 onto the collar 26.

The spiralling surface of the slips 29 and 30 in cooperation with the spiralling threads 39 and 40 of stabilizer body 27 permit the relative rotation of the stabilizer body 27 with respect to the collar 26 to be translated to a tightening force of the slips 29 and 30 with virtually no longitudinal displacement of the slips 29 and 30 or body 27 with respect to the collar 26. This is accomplished by the slips 29 and 30 riding on the sloped or trailing edge 39b and 40b of body threads 39 and 40 and thus causing the inside diameter of slip 29 and 30 to diminish. This smaller slip inside diameter results in a "gripping" of the collar 26.

Another unique and innovative aspect of this invention is that the stabilizer 25 will remain tight while the drill string is in operation since very little rotation of the stabilizer 25 with respect to the collar 26 is required to tighten the stabilizer onto the collar. Thus in the unlikely event the collar becomes loose in the hole, the frictional forces exerted by the walls of hole 22 against stabilizer 25 will quickly tighten the stabilizer 25 onto the collar 26 before any appreciable longitudinal movement of the stabilizer 25 can occur. Thus, tightening of the stabilizer is achieved before serrations 62 and/or collar 26 are galled.

To release stabilizer 25 from collar 26, the stabilizer body 27 is gripped by the drilling table vise or tong. The collar 26 is gripped by another tong. The stabilizer body 27 is rotated in the clockwise direction as the collar 26 is held stationary. The rotation of the stabilizer in the clockwise direction (looking down) results in a relative rotational force being applied to the collar 26 and slips 29 and 30 in the counterclockwise direction. This relative rotational force results in the slip 29 turning counterclockwise (looking down) and slip 30 turning clockwise (looking up). As slips 29 and 30 rotate as discussed above the slips ride back off the sloped or tapered trailing edges 39b and 40b of the stabilizer body threads 39 and 40. This results in the slip serrations releasing the collar 26 and thus a loosening of the stabilizer 25. This rotation causes the body 27 and lugs 44 and 45 to rotate to a point where stop 63 of slip 29 bears against lug 44 and stop 63 of slip 30 bears against lug 45.

Loosening of slips 29 and 30 permit the stabilizer to be repositioned on the collar or removed from the collar by breaking the collar out at a pin and box joint and moving the stabilizer out off of the top of a collar by rotating the stabilizer body in the clockwise direction (looking down) while at the same time lifting the collar up without applying any rotation to the collar.

Figure 20:
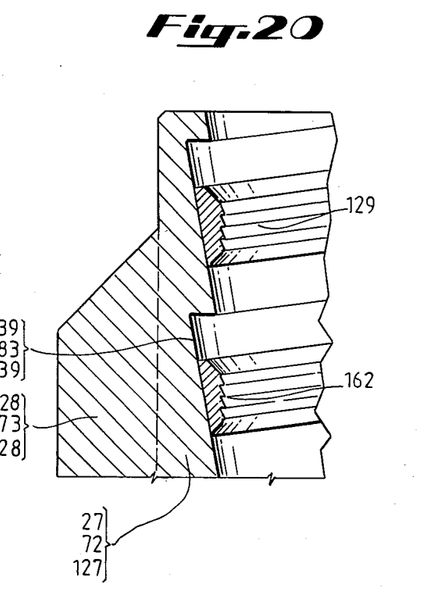
FIG. 20 details the thread pitch and taper for a 7¾" nominal outside diameter drill collar.

For purposes of illustration only the threaded surfaces 39 of stabilizer body 27 is illustrated in FIG. 20 for a stabilizer designed to accommodate a 7¾" nominal outside diameter drill collar (7¾" Nom. Dia. D.C.). The thread pitch and taper are likewise illustrated. The dimensions are for a 7¾" drill collar and are not intended to limit the scope of this invention. The taper and pitch for threaded surface 40 is identical to thread 39 however the thread 40 is a right-hand thread.

It should be understood that the threaded surfaces on slip 29 and 30 correspondingly mate with the threaded surfaces 39 and 40; therefore, the slip threaded surfaces will be designed to correspond to the thread design illustrated in FIG. 20.

Figure 8:
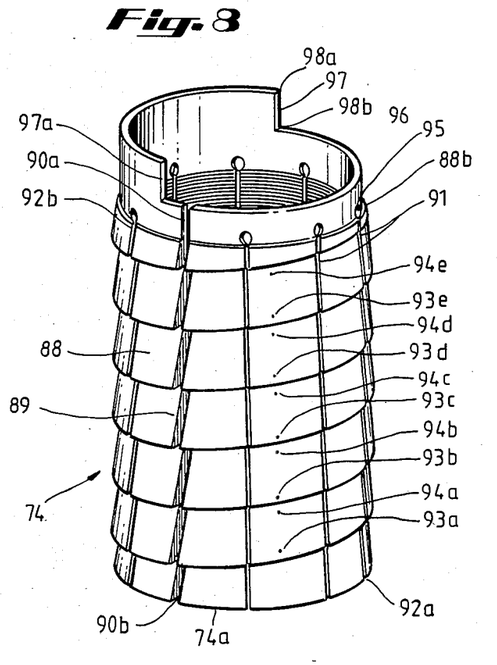
FIG. 8 is a detailed perspective view of a slip segment used for the alternate embodiment of the stabilizer shown in FIG. 7.

The upper slip segment or basket slip 29 shown in FIG. 4 and the lower slip segment or basket slip 30 shown in FIG. 8 may be configured with one or more spiralling or threaded surfaces starting simultaneously as the slip segment is inserted into the stabilizer body 27. When only one spiralling or threaded surface is engaged as the slip is inserted into the body, that configuration is referred to as a single or one start. If two spiralling or threaded surfaces are engaged simultaneously, that configuration is referred to as a two or double start configuration. Configurations with more than two starts are identified in a similar fashion. It is to be understood that the variation in starts does not limit the scope of this invention. In the preferred embodiment, a single start spiralling or threaded surface is found to be more efficient than a two start spiralling or threaded surface.

It will be understood, of course, that for a double start spiralling or threaded surface in the stabilizer body 27, a double start spiralling or threaded slip segment or basket slip 29 and a double start spiralling or threaded slip segment or basket slip 30 are required. It follows that if single start spiralling or threaded surface is used in the body 27, the upper and lower slip segments 29 and 30 must also have single start spiralling or threaded surfaces.

The left and right-hand spiralling or threaded surfaces 39 and 40 of body 27 have been described above as spiralling and or threaded surfaces. The spiralling of left-hand surface or thread 39 occurs from the top opening 33 to the central section 35. The right-hand thread 40 similarly has a spiralling or threaded surface from the bottom 34 to central section 35.

One of the unique and innovative aspects of the present invention is that the slip segments 29 and 30 transfer rotational torque to the stabilizer as the drill string 21 and drill bit 23 are rotated. This rotational torque constantly acts to tighten the stabilizer onto the collar 26 as the string 21 and bit 23 are rotated.

In the event that a stabilizer 25 becomes stuck in the hole 22, an upward pull on the drill string 21 and consequently an upward pull on drill collar 26 will cause the lower slip segment 30 to grip collar 26 tighter as the pulling action tends to pull the collar 26 and lower slip 30 upward with respect to the stuck stabilizer 25. This results in the lower slip 30 traveling on the sloped or tapered trailing edge 40b of the stabilizer body thread 40 in a manner that the slip inside diameter continues to decrease thereby tending to tighten the grip of the slip 30 onto the collar 26. This tightening action thus likewise results in the stabilizer 25 gripping the collar 26 tighter. In a similar manner a downward push on the drill collar 26 will cause the upper slip segment 29 to grip the collar tighter.

Insofar as is known, none of the slip-on stabilizers currently in use permit tightening of the stabilizer body with any one of the following three methods: (1) the transfer of rotational torque in a manner tending to constantly tighten the grip of the stabilizer slip onto the drill collar as the drill string rotates in its normal direction; (2) the translation of an upward pull on the collar in a manner tending to the tighten the lower slip 30; and (3) the translation of a downward push on the collar in a manner tending to tighten the upper slip 29.

ALTERNATE EMBODIMENT

Figure 7:
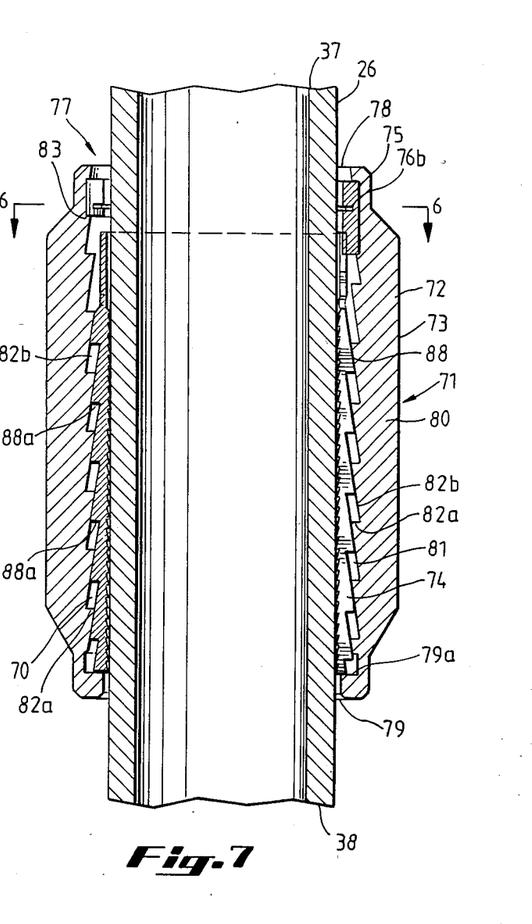
FIG. 7 is a sectional, elevational view, of an alternate embodiment of the stabilizer shown in FIG. 1 with the slip segment in the gripping position.

An alternate embodiment of the present invention is illustrated in FIG. 7. The embodiment illustrated in FIG. 7 differs from the embodiment illustrated in FIG. 2 primarily in that only one slip segment is used. In this embodiment if the stabilizer is stuck, the slip tightens on the drill collar 26 as the collar rotates in a clockwise direction. Likewise the stabilizer tightens onto the collar 26 as the drill string 21 and drill collar 26 are pulled upward.

FIG. 7 illustrates a stabilizer 71 with stabilizer body 72 and stabilizer blades 73 extending outwardly therefrom to contact the sides of a wall borehole 22. Stabilizer 71 includes a slip segment 74 which has a right-hand spiralling or threaded surface 88, a key 75, and a key retainer ring 76b. Slip segment 74 is essentially similar to the lower slip segment or basket slip 30 shown in FIG. 2. The spiralling or threaded surface 88 on slip 74 is essentially similar to the threaded surface on slip 30.

Stabilizer body 72 is a cylindrical or tubular member with a central bore 77 having a top opening 78, a bottom opening 79 and central section 80. Stabilizer body 72 has an interior surface 81, which has a right-hand constant means diameter spiralling or threaded surface 82. The threaded surface 82 spirals from the top 78 to the shoulder 79a of central bore 77. The right-hand spiralling or threaded surface has a leading edge 82a which is nearly at right angles to the longitudinal axis of the stabilizer body 72. In addition the thread 82 has a sloped or tapered trailing edge 82b which slopes or tapers away from the leading edge 82a.

Also shown in FIG. 7, inserted through central bore 77, is drill collar 26. Drill collar 26 is cut away at top end 37 and bottom end 38 for illustration only.

Figure 9:
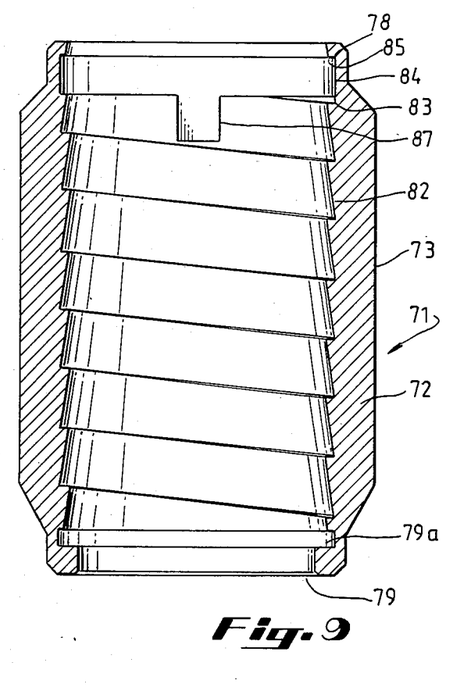
FIG. 9 is an enlarged elevational view partly in section illustrating details of the alternate embodiment shown in FIG. 7.

Right-hand spiralling or threaded surface or thread 82 ends at bottom opening 79 of stabilizer body 72 at shoulder 79a (see FIG. 9). Right-hand spiralling threaded surface begins at top opening 78. Shoulder 83 describes a circumferential slot 84 between top shoulder 85 and shoulder 83 of stabilizer body 72. Slot 84 accommodates key 75.

Key 75 is similar to the key shown in FIGS. 3 and 5, except that it lacks an upper protuberance or lug. As in the case of the key shown in FIGS. 3 and 5, key 75 is a segmented ring, with a plurality of segments, in which the segments have a rectangular cross-section. This type of cross-section facilitates machining of circumferential slot 84 in stabilizer body 72. In this embodiment the segmented ring has three segments.

Key 75 in this embodiment has three ring segments 75a and 75b (not shown) and 75c (not shown). One of the segments (for illustration, segment 75a) has a longitudinal protuberance or lug 86 similar to lug 45 in FIG. 5. Lug 86 is sized to fit in recess 87 illustrated in FIG. 9. Like the segments shown in FIG. 5, the segments 75a, 75b and 75c have a circumferential slot or groove 76a (see FIG. 10) on their inner surface to accommodate a retainer ring 76b similar to retainer ring 32 shown in FIG. 5. The retainer ring 76b urges segments 75a, 75b and 75c radially outward to engage the circumferential slot or groove 84.

Ring segments 75a, 75b and 75c have a cross-sectional area and outside diameter sized to accommodate the inside diameter of slot or groove 84 and fit between bottom shoulder 83 and top shoulder 85.

Figure 6:
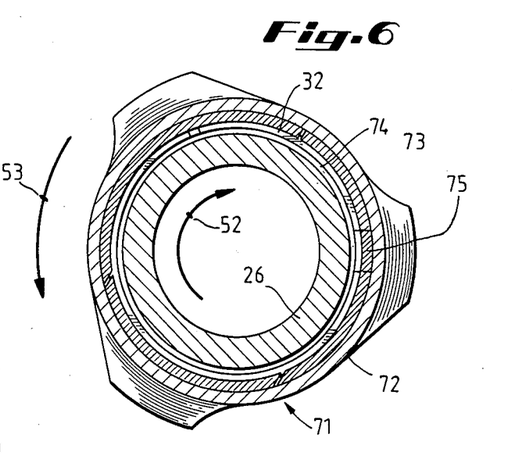
FIG. 6 is a plan view, taken along the section lines 6—6 of FIG. 7, detailing the overall configuration and outline of the stabilizer blades, drill collar, slip segment and releasing key of an alternate embodiment of the invention.

The right-hand spiralling or threaded surface 82 on the stabilizer body 72 is interrupted by a longitudinal slot or recess 87. Slot or recess 87 has an outside diameter and cross-sectional area sized to accommodate key or lug 86. Lug 86 protrudes radially inward sufficiently to grasp slip segment 74 without rubbing against drill collar 26 (See FIG. 6).

Referring to FIG. 8, slip segment 74 has a right-hand spiralling or threaded surface 88 which cooperates with the right-hand spiralling tapered surface 82 in stabilizer body 72. Slip segment 74 has a longitudinal slot 89 cut from its top end 90a to its bottom end 90b. Slot 89 permits slip 74 to expand at the time the collar 26 is inserted into the stabilizer body 72. A plurality of partial longitudinal slots 91 are provided in slip 74 to permit the slip 74 to easily conform to the diameter of the collar 26. Partial longitudinal slots 91 run from the bottom end 92a of slip 74 to the upper portion 92b. A stress relief point 95 is preferably located at the top portion 92b of each partial longitudinal slot 91. Stress relief points 94 are generally circular in configuration and are holes through the wall of slip 74.

The basket slip 74 is preferably machined in such a manner as to produce an equal radius at equivalent points along an imaginary longitudinal line on the outer periphery of slip 74.

For example points 93a, 93b, 93c, 93d, and 93e all have equal radii from the longitudinal centerline of the slip 74. In a similar manner points 94a, 94b, 94c, 94d, and 94e have equal radii from the longitudinal centerline of slip 74.

The radii of points 93a and 94a are not equal. The radius of point 94a is smaller than the radius of point 93a. The slope of a line drawn from points 93a to 94a is equal to the slope of a line drawn from point 93b to 94b. In a similar fashion the slope of lines drawn from point 93c to 94c; 93d to 94d; and 93e to 94e are equal to the slope of the line drawn from point 93a to 94a.

With an equal radius at equivalent points on the slip 74 and spiralling or threaded surface 88 is cut on the slip 74. The surface spirals from the bottom portion 74a of slip 74 to the top portion 74b of slip 74.

As previously discussed the interior spiralling tapered surface of the interior of stabilizer body 72 has a constant mean radius. The constant mean radius describes a constant inside radii for similar points along an imaginary longitudinal line on the interior of body 72.

The inside radii for similar or equivalent points is maintained at a constant as the inside surface of body 72 spirals from the top 78 of the body to the shoulder 79a; to permit the slip 74 to match the spiralling or threaded surface on the interior of body 72.

Slip 74 contains serrations and/or teeth 96 on its interior surface. The serrations or teeth 96 aid in gripping the drill collar 26 inserted through the central bore 77 of the stabilizer body 72.

The right-hand spiralling or threaded surfaces 88 of slip 74 ends at thread stop 88b as the threads intersect stress relief points 95. The placement of the segment stops 97 and 97a is important in that the segment stop 97a should virtually coincide with longitudinal slot 89. At the time lug 86 is engaged by shoulder 97a, a void 70 (see FIG. 7) should not exist between shoulder 88a of slip 88 and leading edge 82a of spiralling or threaded surface 82 on body 72. Segment stop or shoulders 97a and 97 are essentially shoulders which extend longitudinally downward from the top of slip 98a to bottom of shoulder 98b. The length of shoulders 97 and 97a are sufficient to bear against key or lug 86 in recess 87. Segment stop or shoulders 97 and 97a may be fabricated simply by cutting out an arcuate notch in the top of slip 74.

For purposes of illustration only the threaded surface 82 of stabilizer body 72 is illustrated in FIG. 20 for a stabilizer designed to accommodate a 7¾" nominal outside diameter drill collar (7¾" Nom. Dia. D.C.). The thread pitch and taper are likewise illustrated. The dimensions are for a 7¾" drill collar and are not intended to limit the sclope of this invention.

It should be understood that the threaded surface on slip 74 correspondingly mates with the threaded surface 82; therefore, the slip 74 threaded surface 88 will be designed to correspond to the thread design illustrated in FIG. 20.

Figure 10:
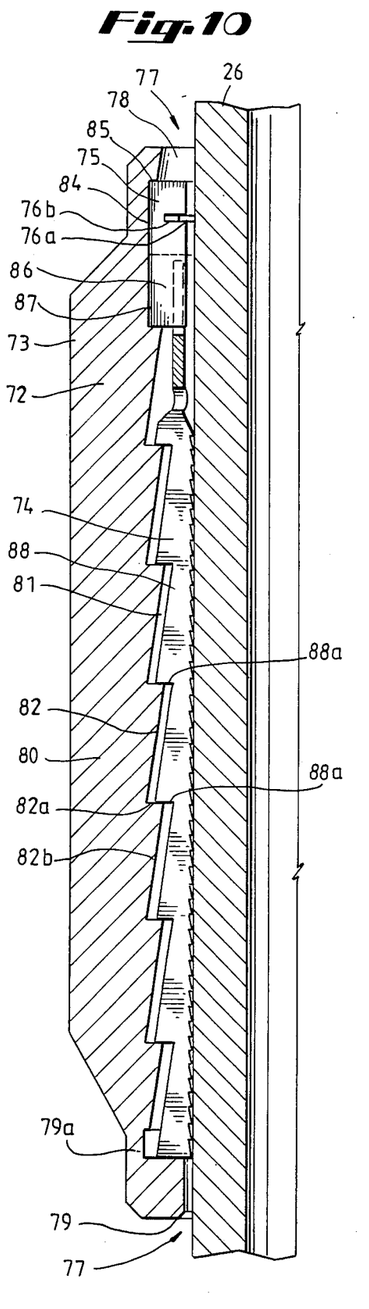
FIG. 10 is a detailed elevational view, partly in section, illustrating the overall configuration and outline of the stabilizer blades, drill collar and slip segment of the alternate embodiment illustrated in FIG. 7 with the slip segment in the released position.

Installation of the stabilizer shown in FIGS. 7 and 10 onto the drill is similar to installation of the stabilizer shown in FIG. 2, however the slip segment 74 must be threaded into stabilizer body 72 before the segmented key 75 is placed in slot 84. Slip 74 and spiralling or threaded surface 82 of the stabilizer shown in FIGS. 7 and 10 performs and functions in a similar fashion as slip 30 and spiralling or threaded surface 40 depicted for FIG. 2 in both the released (see FIG. 10) and tightened (see FIG. 7) positions.

Slip segment 74 shown in FIG. 8 may be configured with one or more spiralling threaded surfaces starting simultaneously as the slip segment is inserted into stabilizer body 72. When only one spiralling or threaded surface is engaged as the slip is inserted into the body that configuration will be referred to as a single or one start. If two spiralling or threaded surfaces are engaged simultaneously that configuration shall be referred to as a two or double start configuration. Configurations with more than two starts are identified in a similar fashion. It will be understood that for a double start spiralling or threaded surface in body 72 a double start spiralling or threaded surfaced segment 74 is required. It follows that if a single start right-hand spiralling or threaded surface is used in body 72, the slip segment 74 must also have single start spiralling or threaded surfaces.

The spiralling surface 88 of slip 74 in cooperation with the spiralling threads 82 of stabilizer body 72 permit the relative rotation of the stabilizer body 72 with respect to the collar 26 to be translated to a tightening force of the slip 74 with virtually no longitudinal displacement of the slip 74 or body 72 with respect to the collar 26. This is accomplished by spiralling surface 88 of slip 74 riding on the sloped or trailing edge 82b of body thread 82 and thus causing the inside diameter of slip 74 to diminish. This smaller slip inside diameter results in a 'gripping' of collar 26.

ALTERNATE PREFERRED EMBODIMENT

Figure 11:
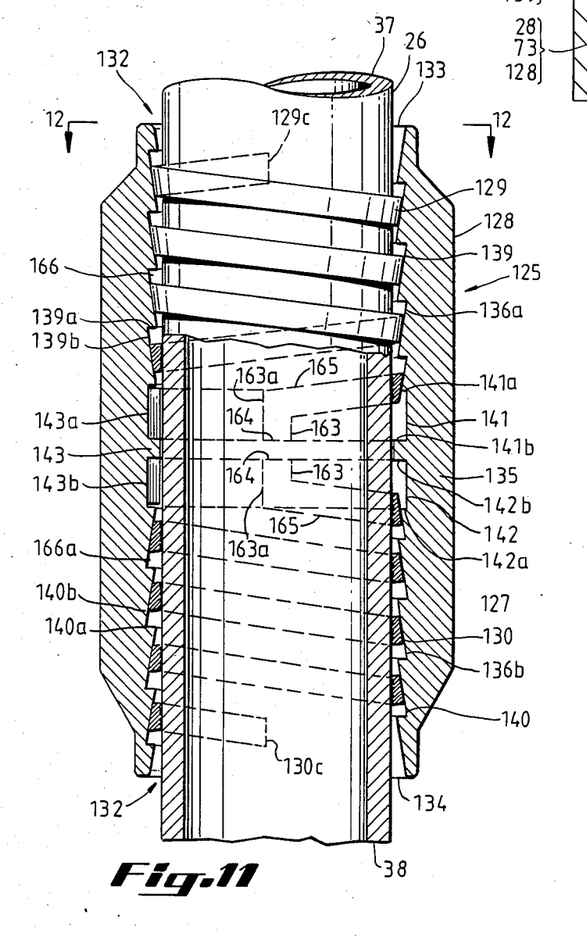
FIG. 11 is an enlarged, partially sectional, elevational view of a stabilizer of the type shown in FIGS. 1 and 2, with an alternate form of slip segments.

The stabilizer 125 shown in FIG. 11 differs from the stabilizer 25 shown in FIG. 2 primarily in that it makes use of coil-type slip. Stabilizer 125 includes a stabilizer body 127 with stabilizer blades 128, upper coil slip 129 and lower coil slip 130. Stabilizer body 127 is a cylindrical or tubular member with a central bore 132 having a top opening 133, a bottom opening 134 and a central section 135. Stabilizer 125 has a left-hand spiralling or threaded surface 139 on its upper inner surface 136a, and a right-hand spiralling or threaded surface 140 on its lower inner surface 136b. The lower end of the upper thread 139 and the upper end of the lower thread 140 terminate at the upper thread and lower thread shoulders 141a and 142a, respectively. Located radially about the central section 135 of body 127 is a protrusion 143 between shoulders 141b and 142b. Shoulders 141a and 141b form a circumferential slot 141. in a similar manner 142a and 142b form a circumferential slot 142. The spiralling or threaded surface 139 spirals from the top opening 133 to the central section 135. The spiralling surface 140 spirals from the lower opening 134 to the central section 135.

Also shown in FIG. 11, inserted through the central bore 132 is drill collar 26. Drill collar 26 is cut away at the top end 37 and the bottom end 38 for illustration only.

Referring specifically to FIG. 11, protrusion 143 protrudes radially from central section 135 to serve as a rest for the bottom 164 of slips 128 and 130 without rubbing against drill collar 26.

Figure 12:
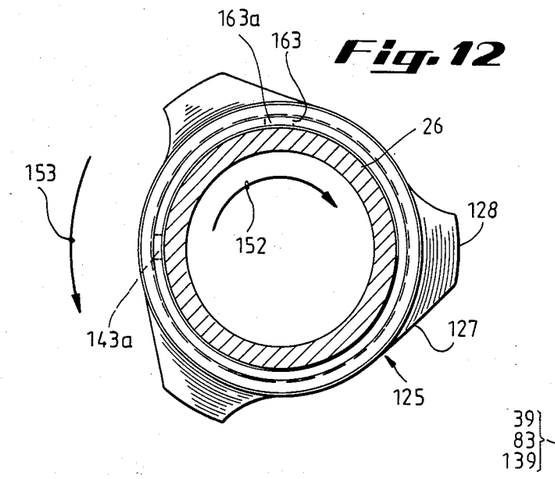
FIG. 12 is a plan view of the stabilizer shown in FIG. 11.

Circumferential slot 141 houses upper slip key 143a as illustrated in FIGS. 11 and 12. Circumferential slot 142 houses lower slip key 143b as illustrated in FIG. 11. Keys 143a and 143b protrude radially inward sufficiently to grasp shoulders 163a on coil slip 129 and 130 without rubbing against collar 26.

Left-hand spiralling or threaded surface 139 has a leading edge 139a which is nearly at right angles to the longitudinal axis of the stabilizer body 127. In addition the thread 139 also has a sloped or tapered trailing edge 139b which slopes or tapers away from the leading edge 139a.

In a similar manner right-hand spiralling or threaded surface 140 has a leading edge 140a which is nearly at right angles to the longitudinal axis of the stabilizer body 127. In addition the thread 140 also has a sloped or tapered trailing edge 140b which slopes or tapers away from the leading edge 140a.

For purposes of illustration only the threaded surfaces 139 of stabilizer body 127 is illustrated in FIG. 20 for a stabilizer designed to accommodate a 7¾" nominal outside diameter drill collar (7¾" Nom. Dia. D.C.). The threaded pitch and taper are likewise illustrated. Thread 140 has dimensions similar to those of thread 139 however thread 140 differs in that it is a right-hand spiralling thread. The dimensions are for a 7¾" drill collar and are not intended to limit the scope of this invention.

It should be understood that slips 129 and 130 correspondingly mate with the threaded surfaces 139 and 140; therefore, the slips 129 and 130 will be designed to mate with the thread design illustrated in FIG. 20.

An upper coil-type slip 129 and a lower coil-type slip 130 are also shown in FIG. 11. The upper coil-type slip 129 is also shown in perspective in FIG. 13. The upper slip is an elongated metal spiral member whose spirals are configured and spaced to mate with the left-hand spiralling or threaded surface 139 of stabilizer body 127. Slips 129 and 130 have serrations and/or teeth 162 on their interior surfaces. Serrations and/or teeth 162 aid in gripping the drill collar 26 inserted through the central bore 132 of the stabilizer 125.

The coil type slips 129 and 130 are preferably manufactured in such a manner as to produce an equal radius at equivalent points along an imaginary longitudinal line on the outer periphery of slips 129 and 130. The description of the equal radius on slips 129 and 130 is similar to the description of the equal radius for slips 29 and 30.

In a similar manner the spiralling or threaded surfaces 139 and 140 of stabilizer body 127 have a constant mean radii. The constant mean radii describes a constant inside radii for similar points along an imaginary longitudinal line on the interior of body 127. The description of this constant inside diameter for similar points is similar to that for body 27 described above.

The left-hand spiralling surface on slip 129 ends at trailing 129c and begins abruptly at segment stop or shoulder 163a. Shoulder 163a extends from top of slip shoulder 165 to bottom 164. The length of shoulder 163a on slip 129 is sufficient to bear against key 143a shown in FIG. 11. Similarly, the length of shoulder 163a on slip 130 is sufficient to bear against key 143b.

The upper slip 129 is capable of being threaded or spiralled into the upper end of the stabilizer body. This spiralling of the slip into body 127 continues until the segement stop 163a at the lower end of the slip runs up against the key 143a of the stabilizer body and bottom 164 of slip 129 rests on shoulder 141b.

The lower slip 130 is similar in design and function to the upper slip 129, except that it has a right-hand spiralling or threaded surface to make up with the right-hand spiralling or threaded surface 140 of the lower stabilizer body. Lower slip 130 also has a stop similar to stop 163a for upper slip 129. The lower slip 130 threads or spirals into the lower end of the stabilizer body until the segement stop 163a on the upper end of the slip 130 runs up against the key 143b of the stabilizer body and bottom 164 of slip 130 rests on shoulder 142b.

Also illustrated in FIG. 12 is rotational arrow 152. The clockwise orientation of arrow 152 illustrates normal drill string/collar rotation (looking downward). Further description of this invention will be described with reference to this standard clockwise rotation. Also illustrated in FIG. 12 is a counterclockwise arrow 153 which illustrates the rotary force or torque of the stabilizer 125 relative to the drill string as the string is rotated as shown by collar rotational arrow 152. The stabilizer's rotary torque, illustrated by arrow 153, is due to the frictional forces exerted by the walls of borehole 22.

To place the stabilizer body 127 on the drill collar 26, slip segments 129 and 130 are threaded or spiralled into the interior of the stabilizer body 127 thereby interengaging each slip with its respective spiralling or threaded interior surface 139 and 140.

The slip segments 129 and 130 are inserted in such a manner that voids 166 and 166a do not exist, thus allowing the slips to expand to a maximum inner diameter between the serrations 162. This maximum allowable inner diameter between the serrations 162 of each slip segment is in essence the released stabilizer position. In this released stabilizer position, the stabilizer 125 may be installed onto the drill collar 26.

The stabilizer 125 is installed onto the drill collar and to the desired drill collar elevation by placing the stabilizer over the collar prior to making up the pin and box joint connection while maintaining the collar relatively stationary and rotating the stabilizer 125 in a clockwise direction. The stabilizer 125 is then positioned on the collar by elevating the string including the collar, while rotating the stabilizer 125 in a clockwise direction while not imparting any rotational movement to the collar 26. When the stabilizer 125 is positioned at the desired elevation the stabilizer is then locked onto the collar by rotating the stabilizer body 127 counterclockwise on the collar 26 while keeping the collar 26 relatively stationary.

Tightening the stabilizer 125 is accomplished by gripping the stabilizer body 127 with the drill table vise or a tong. The collar 26 is gripped by another tong. The stabilizer body is rotated in the counterclockwise direction as the collar 26 is held relatively stationary. This rotation causes the body 127 to rotate while the slips 129 and 130 are held relatively stationary. The slips are held relatively stationary by the gripping action of serrations 162 on the stationary collar 26.

As the stabilizer body 127 rotates in a counterclockwise manner with respect to the slips, slips 129 and 130 grip collar 26 and remain relatively stationary. As the slips 128 and 130 grip collar 26, a rotational torque is applied, in the clockwise direction (looking down) to the slips 129 and 130.

This rotational torque applied to slips 129 and 130 tends to act in a manner to unthread slips 129 and 130 from stabilizer body 127. When the stabilizer is on the collar, the gripping action of slip 129 on the collar 26 and the gripping action of slip 130 on the collar 26, restrain the slips from unthreading from the stabilizer body. Since the slips 129 and 130 are restrained from unthreading the rotational torque applied to the stabilizer body causes the slips 129 and 130 to ride on the sloped or tapered trailing edge 139b and 140b of the stabilizer body threads 139 and 140. This in turn results in a diminution of the inside diameter of slips 129 and 130 which results in further gripping of the collar 26.

As slips 129 and 130 ride on the sloped or trailing edge 139b and 140b voids 166 and 166a are created thus causing slips 129 and 130 to further tighten onto collar 26.

The configuration of the spiralling or threaded surfaces 139 and 140 on body 127 and the matching spiralling or threaded surfaces on each of the coil-type slips 129 and 130 permits the slips to be tightened very quickly with very little rotation of the body 127 with respect to the collar 26.

This tightening of slips 129 and 130 against the collar 26 with very little rotation of the body 125 results in virtually no longitudinal displacement of the slips 129 and 130 with respect to the stabilizer body 127. This relatively small longitudinal displacement of the slips 129 and 130, with respect to the body 127, is of interest because the slip serrations 162 on slips 129 and 130 should remain relatively stationary with respect to the collar 26 as the slips are tightened. In order to minimize longitudinal displacements of the slips 129 and 130 with respect to collar 26 the longitudinal displacement of the body 127 with respect to slips 129 and 130 is likewise preferably minimized.

One of the unique and innovative aspects of the invention is the steep spiralling or threaded surfaces of slips 139 and 140 on the body 127 as well as the corresponding steep spiralling or threaded surfaces on the coil slip 129 and 130. The steep spiralling or threaded surfaces are accomplished on the coil slips 129 and 130 at the time the slips are machined. These threads on slips 129 and 130 in combination with the configuration of the spiralling or threaded surface on the body 127 results in a tightening of the stabilizer onto the collar being achieved with a minimum amount of relative rotation of the body 127 with respect to the collar 26. The minimum amount of rotation results in a minimum longitudinal displacement of the slips 129 and 130 with respect to the body 127.

The minimum longitudinal displacement of the slips 129 and 130 with respect to the body 127 results in a much more efficient tightening of the stabilizer 125 onto the collar 26.

In the unlikely event the collar becomes loose in the hole, the frictional forces exerted by the walls of hole 22 against blades 128 of stabilizer 125 will quickly tighten the stabilizer body 127 onto the collar 126 before any appreciable longitudinal movement of the stabilizer 125 can occur.

In the unlikely event the stabilizer 125 become loose while in the hole 22 only a slight rotation of the stabilizer body with respect to the collar will again tighten the stabilizer. Thus tightening of the stabilizer is achieved before serrations 162 and/or collar 26 are galled.

One of the unique and innovative aspects of the present invention is that the slip segments 129 and 130 transfer rotational torque to the stabilizer as the drill string 21 and drill bit 23 are rotated. This rotational torque constantly acts to tighten the stabilizer 125 onto the collar 26 as the string 21 and bit 23 are rotated.

In the event the stabilizer 125 becomes stuck in the hole 22, an upward pull on the drill string 21 and consequently an upward pull on drill collar 26 will cause the lower slip segment 130 to grip collar 26 tighter as the pulling action tends to pull the collar 26 and lower slip 130 upward with respect to the stuck stabilizer 125. This results in the lower slip 130 traveling on the sloped or tapered trailing edge 140b of the stabilizer body thread 140 in a manner that the slip inside diameter continues to decrease thereby tending to tighten the grip of the slip 130 onto the collar 26. This tightening action thus likewise results the stabilizer 125 gripping the collar 26 tighter. In a similar manner a downward push on the drill collar 26 will cause the upper slip segment 129 to grip the collar tighter.

Insofar as is known, none of the slip-on stabilizers currently in use permit tightening of the stabilizer body with any one of the following three methods: (1) the transfer of rotational torque in a manner tending to constantly tighten the grip of the stabilizer slip onto the drill collar as the drill string rotates in its normal direction; (2) the translation of an upward pull on the collar in a manner tending to the tighten the lower slip 130; and (3) the translation of a downward push on the collar in a manner tending to tighten the upper slip 129.

To release stabilizer 125 from the collar 26, the stabilizer body 127 is gripped by the drilling table vise or tong. The collar 26 is gripped by another tong. The stabilizer 125 is rotated in the clockwise direction as the collar 26 is held stationary. This rotation causes the body 26 keys 143a and 143b to rotate to a point where segment stops 163a of coil-type slip 139 and 140 bears against keys 143a and 143b.

The rotation of the stabilizer in the clockwise direction (looking down) results in a relative rotational force being applied to slips 129 and 130 in the counterclockwise direction. This relative rotational force results in slip 129 turning counterclockwise (looking down) and slip 130 turning clockwise (looking up). As slips 129 and 130 rotate as discussed above, the slips ride off of the sloped or tapered trailing edge 139b and 140b of the stabilizer threads 139 and 140. This results in the slip serrations 162 releasing the collar, thus a loosening of the stabilizer.

The loosening of slips 139 and 140 permit stabilizer 125 to move up and down in the drill collar, thus permitting the stabilizer to be repositioned or removed from the collar.

Figure 14:
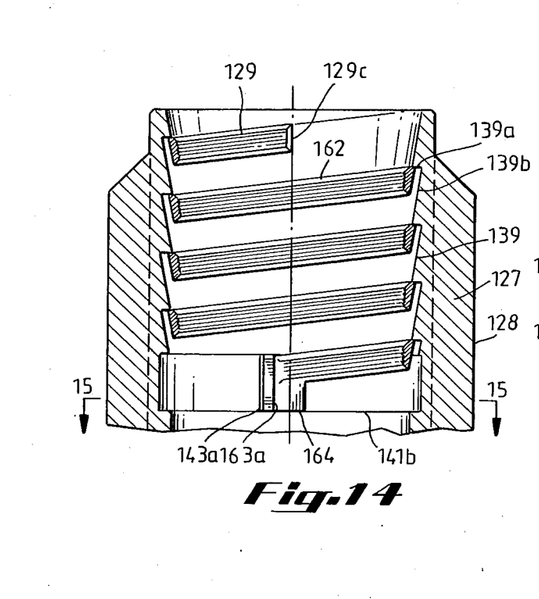
FIG. 14 is a partial elevational view of the stabilizer shown in FIG. 11, partially in section, with the slip segment in the released position and prior to insertion of the collar.
Figure 15:
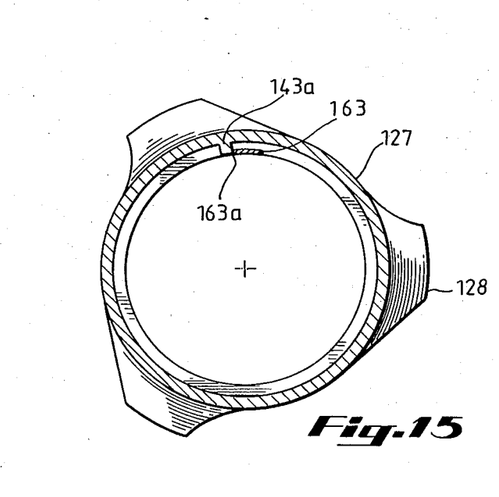
FIG. 15 is a simplified plan view of FIG. 14 illustrating the relative position of the slip and the stabilizer body key.

To provide a better understanding of the interaction between slip 129 and threaded surface 139 of stabilizer body 127, reference should be made to FIGS. 14 through 19 inclusive. FIGS. 14 and 15 illustrate slip 129 threaded into the top of stabilizer body 127 prior to insertion of drill collar 26.

FIG. 14 illustrates slip 129 threaded into threaded surface 139. Slip 129 shoulder 163a butts against key 143a while slip 129 bottom 164 rests against shoulder 141b. Additionally, coil 129 rests against the leading edge 139a of the left-hand spiralling or threaded surface 139. Referring to FIG. 15, a plan view of FIG. 14, the relative positions of key 143a with respect to shoulder 163a of slip 129 is illustrated.

Figure 16:
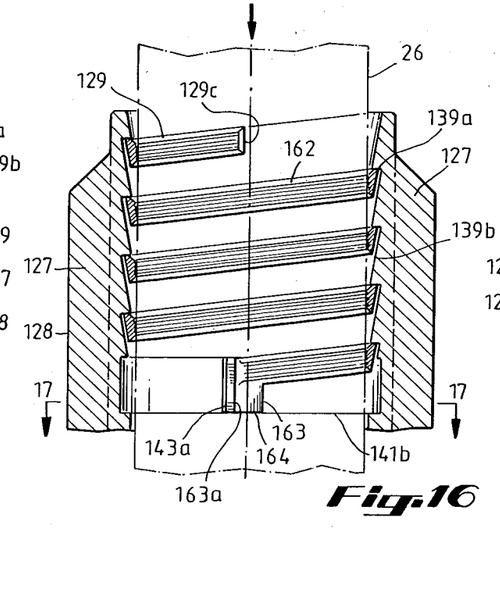
FIG. 16 is a partial elevational view of the stabilizer shown in FIG. 11, partially in section, with the slip segment in the released position and just after insertion of the collar.
Figure 17:
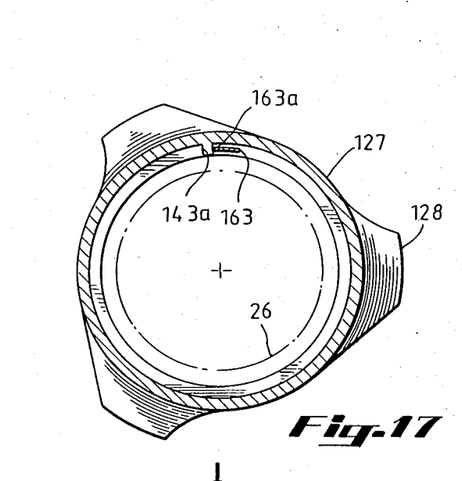
FIG. 17 is a simplified plan view of FIG. 16 illustrating the relative position of the slip and the stabilizer body key.

Referring now to FIG. 16, coil slip 129 is illustrated in the released or untightened position just after insertion of collar 26. It should be noted that at the time collar 26 is inserted into stabilizer body 127 slip 129 expands radially outward thereby moving the trailing edge 129c of slip 129 away from the centerline of collar 26. Additionally, the bearing surface, of slip 129 on the thread leading edge 139a of the left-hand spiralling or threaded surface 139, increases. The position of shoulder 163a with respect to key 143a however does not change. This is further illustrated by FIG. 17, a plan view of FIG. 16.

The collar 26 inserted through slip 129 and stabilizer body 127 is gripped by serrations 162 although the stabilizer has not been tightened onto the collar 26 due to the minimal clearance between slip 129 and collar 26.

Figure 18:
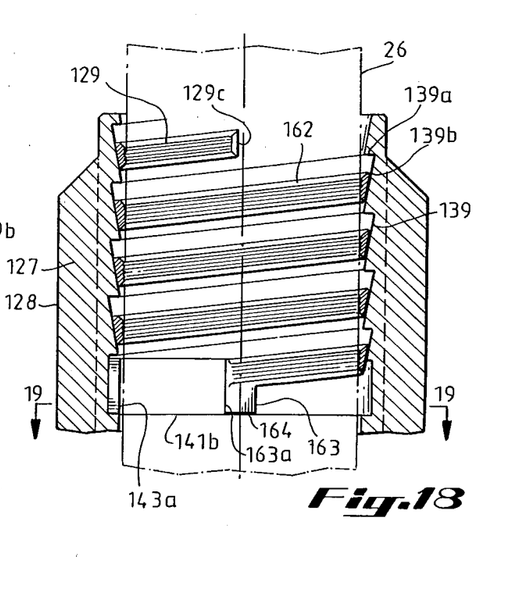
FIG. 18 is a partial elevational view of the stabilizer shown in FIG. 11, partially in section, with the slip segment in the tightened position thus gripping the collar.
Figure 19:
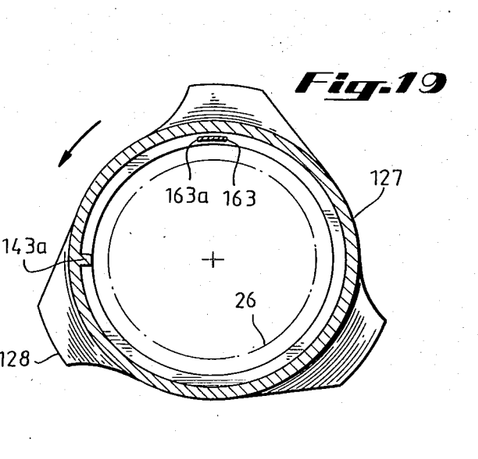
FIG. 19 is a simplified plan view of FIG. 18 illustrating the relative position of the slip and the stabilizer body key.

Referring now to FIG. 18, the slip 129 is illustrated in the tightened position. The stabilizer body 127 has been locked on or tightened onto the collar 26. The trailing edge 129c of the slip 129 has not moved appreciably from the position illustrated in FIG. 16. However, the coil slip 129 is no longer resting on the leading edge 139a or the left-hand spiralling or threaded surface 139 but rather is riding on the sloped or tapered trailing edge 139b of the left-hand spiralling threaded surface 139. As the slip 129 rides on the sloped or tapered trailing edge 139b of the left-hand spiralling or threaded surface 139 the inside diameter of slip 129 is decreased. This decrease in the inside diameter of slip 129 results in a tightening of the slip 129 onto the collar 26; therefore creating a tighter grip by teeth or serrations 162. Referring to FIG. 19, a plan view of FIG. 18 the relative position of key 143a with respect to shoulder 163a is illustrated. It should be noted that approximately a 90 degree angular displacement is anticipated between key 143a and segment stop 163a from the untighten to the tightened position.

Figure 13:
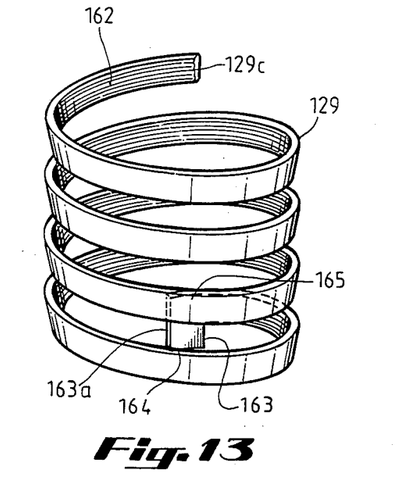
FIG. 13 is a detailed perspective view of an upper slip segment used in the stabilizer shown in FIG. 11.

The upper slip 129 shown in FIG. 13 and the lower slip 130 shown in FIG. 11 may be configured with only one spiralling or threaded surface or thread starting simultaneously as the slip segment is inserted into the stabilizer body 127.

An additional alternate stabilizer embodiment may be realized by using a single right-hand spiralling or threaded coil-type slip similar to the one illustrated in FIG. 13 by combining this single slip with a stabilizer such as the one illustrated in FIG. 9.

Referring to FIG. 12, it will be noted that the individual blades 128 of the stabilizer have a leading edge which slopes much more gradually than the trailing edge. In a similar manner, referring to FIGS. 3 and 6 blades 28 and 73 of the stabilizer have a leading edge which slopes much more gradually than the trailing edge. The gradual slope of the leading edge of blades 28, 73, and 128 helps to avoid buildup of formation cuttings, while the recessed nature of the trailing edge provides a larger flow path for drilling fluid.

There has been provided in accordance with the present invention a stabilizer which has been described in terms of specific embodiments thereof; however, other alternatives, modifications and variations will be apparent to those skilled in the art from the foregoing description. Accordingly, this disclosure is intended to embrace all such alternatives, modifications and variations that fall within the spirit and scope of the appended claims.

What we claim is:

1. A stabilizer for use in a drilling string comprising:
a substantially cylindrical body member having a central passageway to accommodate the drill string, the inside surface of the body member defining a right-hand spiralling thread with a tapered trailing edge which spirals from a starting point on said body member, said thread terminating internally of said body member in an arcuate recess extending around the interior of said body member;
a key member is secured to the inner wall surface of said recess of said body member, said key member having a lug extending longitudinally of said body member within said recess;
a slip member adapted to thread within the body member between said body member and said drill string, the slip defining a right-hand thread with a matching tapered trailing edge configured to make up with said right-hand thread on said body member and to wedge between said body member and said drill string, one end of said slip terminating in a longitudinally disposed shoulder capable of abutting said lug upon threading of said slip within said body member.

2. The stabilizer of claim 1 in which said lug is integral with said body member.

3. The stabilizer of claim 1 in which said arcuate recess extends around the periphery of the interior surface said body member and said key member is attached to one of a plurality of segments of a ring-like structure, each said segment sized to fit within said recess around said drill string, the inner surface of each said segment defining an arcuate ring-shaped depression sized to receive a common ring member disposed transversely relative to the longitudinal axis of said body member.

4. The stabilizer of claim 1 in which said slip member is an integral basket-like member.

5. The stabilizer of claim 4 in which the basket-like slip member has a longitudinal slot extending from the bottom of slip member to the top of slip member.

6. The stabilizer of claim 5 in which the basket-like slip member has partial longitudinal slots disposed about the circumference of the slip member.

7. The stabilizer of claim 1 in which said slip member is a coil-type member.

8. The stabilizer of claim 1 wherein the slip member has serrations or teeth like members on the interior surface of the slip, said serrations or teeth-like members adjacent the drill string.

9. The stabilizer of claim 1 further comprising at least one blade longitudinally disposed on the exterior surface of said body member.

10. The stabilizer of claim 1 wherein the slip member and body have a single start thread.

11. The stabilizer of claim 1 wherein the slip member and body threads have more than one start.

12. The stabilizer of claim 1 wherein the right-hand spiralling thread on the interior of the stabilizer body has a leading edge substantially at right angles to the longitudinal axis of the body and sloped or tapered trailing edge sloping away from said leading edge.

13. The stabilizer of claim 1 further comprising stabilizer blades with a trailing edge slope greater than the leading edge slope.

14. A stabilizer for use in a drilling string comprising:
a substantially cylindrical body member having a central passageway to accommodate the drill string, said member defined by an upper inside surface and a lower inside surface;
the upper inside surface of the body member defining a left-hand spiralling thread with a tapered trailing edge which spirals from the top of the upper inside surface towards the center of said body member, said left-hand spiralling thread terminating internally of said body member in an arcuate recess extending around the interior of said body member;
the lower inside surface of the body member defining a right-hand spiralling thread with a tapered trailing edge which spirals from the bottom of the lower inside surface towards the center of said body member, said right-hand spiralling thread terminating internally of said body member in the arcuate recess extending around the interior of said body member;
the arcuate recess in the center portion of the cylindrical body separating the terminus of the left-hand spiralling thread from the terminus of the right-hand spiralling thread;
a key member secured to the inner wall surface of said recess of said body member, said key member having a lug extending downward and a lug extending upward, said lugs extending longitudinally within said body member within said recess and with the lower lug interrupting the right-hand spiralling thread and the upper lug interrupting the left-hand spiralling thread at the terminus of each thread;
an upper slip member adapted to spirally thread within the upper end of said body member between said body member and said drill string, the slip defines a left-hand spiralling thread, configured to make up with said left-hand spiralling thread on said body member, the lower end of said slip terminating in a longitudinally disposed shoulder capable of abutting said upper lug upon threading of said slip within said body member;
a lower slip member adapted to spirally thread within the lower end of said body member between said body member and said drill string, the slip defines a right-hand spiralling thread, configured to make up with said right-hand spiralling thread on said body member, the upper end of said slip terminating in a longitudinally disposed shoulder capable of abutting said lower lug upon threading of said slip within said body member.

15. The stabilizer of claim 14 in which said lugs are intergal with said body member.

16. The stabilizer of claim 14 in which said arcuate recess extends around the circumference of the interior surface of said body member and said key member is attached to one of a plurality of segments of a ring-like structure, each said segment sized to fit within said recess around said drill string, the inner surface of each said segment defining an arcuate ring-shaped depression sized to receive a common ring member disposed transversely relative to the longitudinal axis of said body member.

17. The stabilizer of claim 14 in which said slip members are integral basket-like members.

18. The stabilizer of claim 17 in which each basket-like slip member has a longitudinal slot extending from the bottom of slip member to the top of slip member.

19. The stabilizer of claim 18 in which each basket-like member has partial longitudinal slots disposed about the circumference of the slip member.

20. The stabilizer of claim 14 in which each said slip member is a coil-type member.

21. The stabilizer of claim 14 wherein each slip member has serrations or teeth like members on the interior surface of the slip, said serrations or teeth like members adjacent the drill string.

22. The stabilizer of claim 14 further comprising at least one blade longitudinally disposed on exterior of said body.

23. The stabilizer of claim 14 wherein the slip member and body have a single start thread.

24. The stabilizer of claim 14 wherein the slip member and body threads have more than one start.

25. The stabilizer of claim 14 wherein the right-hand spiralling thread on the stabilizer body and the left-hand spiralling thread on the stabilizer body each have a leading edge substantially at right angles to the longitudinal axis of the body and a sloped or tapered trailing edge sloping away from the leading edge.

26. The stabilizer of claim 14 wherein the right-hand spiralling thread on the lower inside surface of the body mating with the right-hand spiralling thread on the lower slip member tightens the slip onto the collar as the collar is pulled upwards and where the left-hand spiralling thread on the upper inside surface of the body mating with the left-hand spiralling thread on the upper slip member tightens the slip onto the collar as the collar is pushed downwards.

27. The stabilizer of claim 14 further comprising stabilizer blades with a trailing edge slope greater than the leading edge slope.

28. A stabilizer for use in a drill string comprising:
a substantially cylindrical body member having a central passageway to accommodate the drill string, said member defined by an upper inside surface and a lower inside surface;
the upper inside surface of the body member defining a left-hand spiralling thread which spirals from the top of the upper inside surface towards the center of said body member, said left-hand spiralling thread terminating internally of said body member in an arcuate recess extending around the interior of the said body member;

the lower inside surface of the body member defining a right-hand spiralling thread which spirals from the bottom of the lower inside surface towards the center of said body member, said right-hand spiralling thread terminating internally of said body member in the arcuate recess extending around the interior of said body member;

the arcuate recess in the center portion of the cylindrical body separating the terminus of the left-hand spiralling thread from the terminus of the right-hand spiralling thread;

a key member secured to the inner wall surface of said recess of said body member, said key member having a lug extending downward and a lug extending upward, said lugs extending longitudinally within said body member within said arcuate recess with the lower lug interrupting the right-hand spiralling thread of the cylindrical body and the upper lug interrupting the left-hand spiralling thread of the cylindrical body at the terminus of each thread;

a coil-type slip member comprising an upper slip member with a corresponding left-hand coil rigidly attached to a lower slip member with its corresponding right-hand coil, said upper portion of said slip member configured to make up with said left-hand spiralling thread on said body member and said lower portion of said slip member configured to make up with said right-hand spiralling thread on said body member.

29. A method of attaching a downhole slip-on drill string stabilizer on a drill string rotating in a clockwise direction comprising:

(a) providing a substantially tubular body member having a central passageway;

(b) providing an upper inside surface with a left-hand spiralling thread with a tapered edge on the upper end of the tubular body;

(c) providing a lower inside surface with a right-hand spiralling thread with a tapered edge on the lower end of the tubular body;

(d) providing an upper slip member, with a left-hand spiralling thread adapted to fit within the upper inside surface of the body;

(e) providing a lower slip member, with a right-hand spiralling thread, adapted to fit within the lower inside surface of the body;

(f) providing a right-hand spiralling thread on the lower inside surface of the tubular body mating with the right-hand spiralling thread of the lower slip member tending to tighten the slip onto the drill string as the drill string is pulled upward;

(g) providing a left-hand spiralling thread on the upper inside surface of the tubular body mating with the left-hand spiralling thread of the upper slip member tending to tighten the slip onto the drill string as the drill string is pushed downward;

(h) placing said slip members in said tubular body and positioning them on the drill string;

(i) rotating the drill string relative to the tubular body in a counter-clockwise direction in a manner tending to releasably open the slip members to install said tubular body onto the drill string to its desired position on the drill string;

(j) rotating the drill string relative to the tubular body in a clockwise direction in a manner causing the slip members to tighten onto the drill string by rotating the slip members clockwise with the drill string relative to a stationary tubular body, causing said slip member to ride up on the tapered section of the body threads thereby wedging said slip members between body and drill string in a manner to lock the stabilizer onto the drill string at the desired position.

* * * * *

UNITED STATES PATENT AND TRADEMARK OFFICE
CERTIFICATE OF CORRECTION

PATENT NO.   :  4,630,690

DATED        :  December 23, 1986

INVENTOR(S)  :  Beasley et al

It is certified that error appears in the above-identified patent and that said Letters Patent is hereby corrected as shown below:

Column 10, line 14, delete [the tighten] and add --tighten the --.

Column 10, line 31, delete [wall] and add --well --.

Column 10, line 43, delete [means] and add --mean--.

Column 12, line 27, delete [sclope] and add --scope--.

Column 13, line 33, delete [128] and add --129--.

Column 14, line 31, delete [segement] and add --segment--.

Column 14, line 41, delete [segement] and add --segment--.

Column 15, line 27, delete [128] and add --129--.

Column 16, line 23, delete [become] and add --becomes--.

Column 16, line 58, delete [the tighten] and add --tighten the--.

Column 17, line 65, delete [untighten] and add --untightened--.

Signed and Sealed this

Thirty-first Day of May, 1988

*Attest:*

DONALD J. QUIGG

*Attesting Officer*    *Commissioner of Patents and Trademarks*